July 22, 1952    A. Y. DODGE    2,603,952
WHEEL CYLINDER FOR HYDRAULIC BRAKE MECHANISM
Filed July 3, 1948
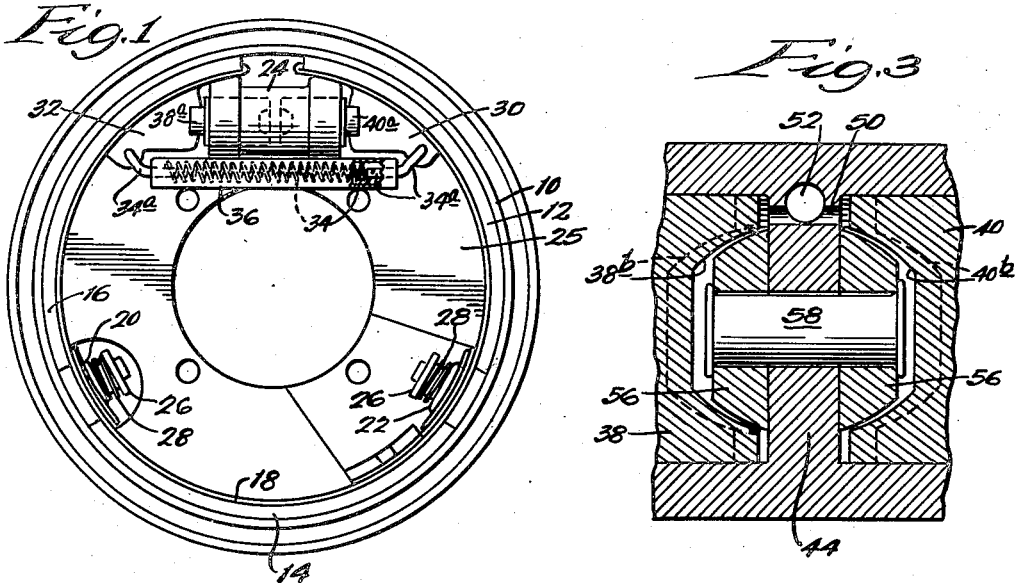
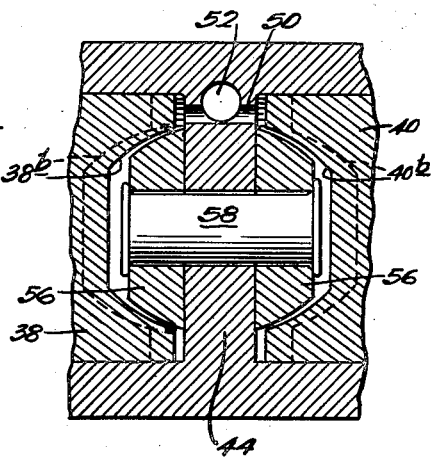
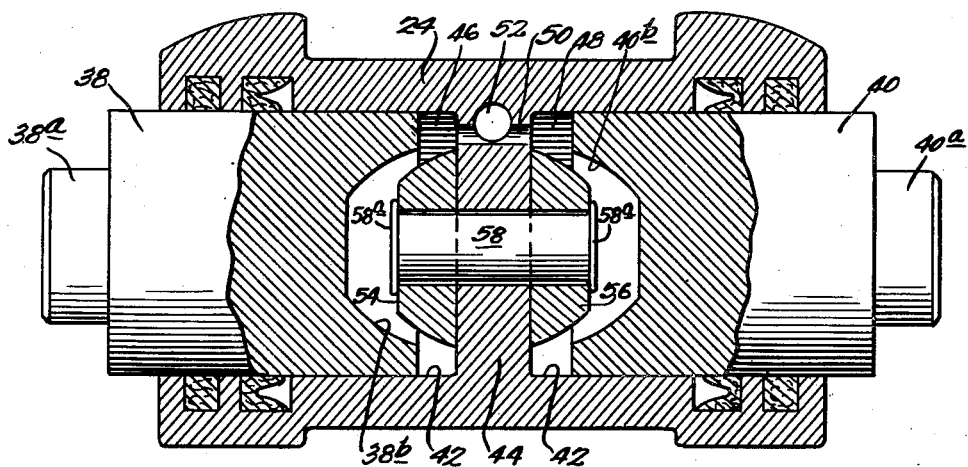
Inventor:
Adiel Y. Dodge,
By Dawson, Ooms, Booth &y Spangenberg,
Attorneys.

Patented July 22, 1952

2,603,952

UNITED STATES PATENT OFFICE 2,603,952

WHEEL CYLINDER FOR HYDRAULIC BRAKE MECHANISM

Adiel Y. Dodge, Rockford, Ill.

Application July 3, 1948, Serial No. 37,033

6 Claims. (Cl. 60—54.6)

My invention relates to an improved wheel cylinder for a hydraulic brake mechanism incorporating means to prevent "clicking."

When pedal pressure is applied in a hydraulic brake system, the pistons travel in the brake-applying direction and cause the brake shoes to engage the inner periphery of the brake drum, thereby causing the brakes to grip and tend to rotate the shoes and pistons in the direction of wheel rotation. The resulting force on the pistons tends to cause one piston to strike the back wall of the wheel cylinder, thereby producing an annoying clicking sound and subjecting the wheel cylinder, piston, and associated mechanism to undesirable shock.

Heretofore efforts have been made to dampen the shock associated with sudden application of brake pressure by reducing the opening by which the brake fluid is admitted to the wheel cylinders to such small size that dashpot action is achieved. This method, however, correspondingly slows the brake response and tends to render vehicle operation dangerous. In addition, the restricted inlet openings are particularly subject to obstruction by dirt and foreign matter in the brake fluid.

In accordance with the present invention, the pistons and cylinders of the wheel cylinder assembly of a hydraulic brake mechanism are formed to define a space having progressively decreased size as the piston moves in the brake releasing direction and from which fluid can escape only through an orifice or passageway of progressively decreased size and which is independent of the opening provided to admit fluid to the cylinder. When a piston is shifted in direction to strike the back wall of the cylinder, fluid is entrapped in this space and is released at a limited rate fixed by the progressively greater restriction of fluid flow through the orifice, thereby preventing the hammer effect that would otherwise give rise to "clicking."

In this specification and the accompanying claims the term "wheel cylinder" is used to designate the complete assembly provided in a hydraulic brake mechanism to convert fluid pressure changes to corresponding brake movements.

It is therefore a general object of the present invention to provide an improved wheel cylinder for a hydraulic brake mechanism that is not subject to "clicking."

Further it is an object of the present invention to provide a unitary wheel cylinder construction for a hydraulic brake mechanism which is not subject to "clicking" and which may be used to replace wheel cylinders of conventional hydraulic braking mechanisms.

Another object of the present invention is to provide an improved wheel cylinder for a hydraulic brake mechanism that is not subject to "clicking" but which at the same time does not prevent rapid application of braking action.

Yet another object of the present invention is to provide an improved wheel cylinder construction for a hydraulic brake mechanism and which embodies features of construction combination and arrangement whereby it is simple in construction, reliable in operation, and yet inexpensive to manufacture, to the end that a unit of maximum utility is achieved.

The novel features which I believe to be characteristic of my invention are set forth with particularity in the appended claims. My invention itself, both as to its organization and mode of operation, can best be understood from the following description taken in connection with the accompanying drawing in which:

Figure 1 is an end elevational view of a complete brake drum assembly incorporating the wheel cylinder of the present invention;

Figure 2 is an enlarged axial cross-sectional view of the wheel cylinder of the present invention; and Figure 3 is an enlarged fragmentary portion of the view of Figure 2 showing the wheel cylinder in successive positions of operation.

Referring now to Figure 1, there is shown at 10 a brake drum which is attached to a vehicle wheel (not shown) for rotations therewith. Three brake shoes, 12, 14, and 16, are attached to brake band 18 by rivets or other suitable means and expand against the inner periphery of drum 10 when the band 18 is subjected to tangential compression. The band 18 (and shoes 12, 14, and 16) are held against rotation by the brackets 20 and 22 attached to a suitable support plate 24. This action is supplemented by the support achieved through wheel cylinder 24 which is securely held to support plate 25.

The brake band 18 may be located on the mounting plate 25 by the pins 26 which are received in aligned openings in the band and brackets 20 and 22 and have headed end portions to retain the pins in these openings. Springs 28 hold the pins snugly against the brake band while permitting limited radial and circumferential motion of the band for braking movements.

A pair of brackets 30 and 32 are attached to opposite ends of the brake band 18. These brackets each have a spring receiving opening adapted to receive the hooked end portions 34a of the spring 34. The former portions are attached to the spring proper which is held in casing 36 as indicated.

The brackets 30 and 32 further define edge portions adapted to receive the ends 38ª and 40ª of the pistons 38 and 40. These edge portions are substantially straight and the ends 38ª and 40ª are substantially cylindrical. The latter are notched to receive the edge portions of the brackets to define an effective structure for expanding band 18 as the pistons 38 and 40 expand.

A structure similar to the foregoing structure is more fully described in my copending application Serial No. 792,025, filed December 16, 1947, now abandoned, and entitled "Brakes" and operates to cause brake shoes 12, 14, and 16 to engage the drum 10 when ends 38ª and 40ª of pistons 38 and 40 expand against the action of spring 34.

The construction of the cylinder 24 and the associated mechanism may best be understood by reference to Figures 2 and 3. As indicated, cylinder 24 has a cylindrical cavity 42, which snugly receives the opposed pistons 38 and 40. A back wall 44 extends across the cavity 42 in the region intermediate the pistons 38 and 40; thus defining two separate chambers 46 and 48 in which fluid is received to shift pistons 38 and 40 respectively.

An opening 50 is formed in the back wall 44 to define a channel for fluid communication between chambers 46 and 48. A fluid inlet opening 52 is in communication with opening 50 to admit or release fluid from the chambers 46 and 48.

The opening 52 is in communication with a hydraulic brake pressure applying mechanism (not shown). This mechanism may, for example, include a master cylinder and piston combination connected by suitable piping to opening 52. A foot pedal or other suitable means is provided to shift the piston and thus pressurize the fluid in the master cylinder. This pressure is communicated to the chambers 46 and 48 and thereby urges pistons 38 and 40 in opening movements to compress the brake band 18 against the bias of spring 34 and apply the brakes. When the foot pedal is released, the brake fluid flows through opening 52 and back into the master cylinder, thereby relieving the compression on brake band 18 and releasing the brakes.

Each of the pistons 38 and 40 is hollowed out along the edge facing back wall 44 to define the curvilinear cone shaped recesses 38ᵇ and 40ᵇ respectively. A pair of curvilinear cones 54 and 56 are held against back wall 44 for mating engagements with the recesses 38ᵇ and 40ᵇ respectively. These are held to wall 44 by rivet 58 which extends through aligned openings in the cones and in back wall 44 and which has headed end portions 58ª overlying the cones to retain them in position.

The openings provided in cones 54 and 56 and in the back wall 44 to receive the rivet 58 are made somewhat larger in diameter than that rivet. This permits limited shifting movements of these members relative to the rivet and results in accurate alignment of the cones with the recesses when the pistons 38 and 40 shift together.

As is best seen in Figure 3, the edge portions of the curvilinear cone shaped recesses 38ᵇ and 40ᵇ are of diameter equal to or slightly greater than the corresponding diameters of the cones 54 and 56. Moreover, the radius of curvature of the cones 54 and 56 as seen in the axial cross section of Figure 2 is smaller than the corresponding radius of curvature of the recesses 38ᵇ and 40ᵇ. Hence as the pistons 38 and 40 are shifted towards these cones, the passages allowed for escape of braking fluid from the cavities defined by cones 54 and 56 and the recesses 38ᵇ and 40ᵇ become progressively more restricted. The frictional resistance to fluid flow through these passages is thereby progressively increased with correspondingly increased force against the pistons.

The foregoing action can best be understood from Figure 3 where the solid lines show the pistons in the nearly closed position where there is great resistance to escape of fluid from the scape defined by the pistons and cones 54 and 56. The dotted lines of that figure show the pistons is a more nearly open position wherein a large passage is provided for escape of fluid from the space defined by pistons 38 and 40 and cones 54 and 56 with consequent small opposition to movement of the pistons.

The provision of recesses 38ᵇ and 40ᵇ in cooperative relation with cones 54 and 56, prevents the annoying "clicking" heretofore associated with application of brake pressure. After the brakes have been applied and grip the brake drum, one of the pistons 38 or 40 travels towards back wall 44 under the torque associated with the braking action. During the initial stages of travel, this movement is limited only by the inertia of the parts and the fluid resistance associated with passage 50 and opening 52. However, as the piston movement continues and the edges of the recess approach the cone 54 or 56, the passage for escape of fluid from the recess becomes progressively more restricted with the consequence that the resistance to fluid flow through the passages becomes the dominant force opposing piston movement. This force increases gradually to a very high value and thereby prevents the hammer blow or "clicking" of the piston striking back wall 44.

Since the buildup of force associated with escape of fluid from recesses 38ᵇ and 40ᵇ is progressive and depends on the piston velocity, the piston is smoothly decelerated with minimum tendency to jar the structures.

Since the decelerating effects are achieved by the restricted space at the edges of the recesses 38ᵇ and 40ᵇ, the passage 50 and the opening 52 may be made of large size to permit rapid braking action and to reduce the possibility of clogging by foreign matter contained in the braking fluid.

Moreover, even though the edges of recesses 38ᵇ and 40ᵇ define passages for restricted fluid flow, when the pistons travel towards wall 44, there is no tendency to retard or obstruct movements of the opposite piston in the opposite direction upon application of brake pressure. This is due to the fact that brake fluid pressure is effective first against the annular edge portions of the cylinders 38 and 40 and later into the recesses 38ᵇ and 40ᵇ.

From the foregoing description, it will be apparent that the recesses 38ᵇ and 40ᵇ coact with the cones 54 and 56 to define spaces having progressively decreased size as the pistons 38 and 40 move in the direction of the back wall 44. Moreover, these spaces have outlets of progressively decreased cross-sectional area as the pistons approach back wall 44.

The wheel cylinder construction of the present invention involves only internal changes from conventional wheel cylinder constructions.

As a consequence, it may be used to replace conventional wheel cylinders without unduly modifying the brake structure.

While I have shown and described a specific embodiment of the present invention it will, of course, be understood that I do not wish to be limited thereto since various modifications and alternative constructions may be made without departing from the spirit and scope thereof. I, of course, intend by the appended claims to cover all such modifications and alternative constructions as fall within the true spirit and scope of my invention.

I claim:

1. In a wheel cylinder for a hydraulic brake mechanism, a cylinder having a back wall with an opening to admit braking fluid, a piston snugly fitted in said cylinder and having a recess in the shape of a curvilinear cone facing said back wall at a point remote from said opening, said back wall having a projecting curvilinear cone formed with a smaller radius of curvature than the recess for mating engagement with said recess to define a space having an outlet of progressively decreased cross-sectional area as said cylinder approaches said back wall.

2. In a wheel cylinder for a hydraulic brake mechanism, a cylinder having a back wall with an opening of substantial area to admit fluid thereto for rapid braking action, a piston snugly fitted in said cylinder, said piston having a recess in the form of a curvilinear cone facing said back wall at a point remote from said opening, said back wall having a projecting curvilinear cone formed with a smaller radius of curvature than the recess for mating engagement with said recess to define a space having an outlet of progressively decreased cross-sectional area as said piston approaches said back wall, the effective area of said outlet being substantially less than the area of said opening when said piston is close to said back wall.

3. In a wheel cylinder for a hydraulic brake mechanism, a member defining a pair of spaced cylinders having a common back wall with an opening in said back wall to admit fluid to each of said cylinders, pistons snugly fitted in each of said cylinders, each of said pistons having a recess in the form of a curvilinear cone facing said back wall at a point remote from said opening, a pair of curvilinear cones for mating engagement with said recesses to define spaces having outlets of progressively decreased area as said cylinders approach said back wall, said cones and said back wall having aligned rivet-receiving openings, and a rivet extending through said openings and having headed end portions to hold said cones in position, said last openings being of size to permit limited shifting movements of said cones to alignment with said recesses.

4. In a wheel cylinder for a hydraulic brake mechanism, a member defining a pair of spaced cylinders having a common back wall with an opening of substantial area to admit fluid thereto for rapid braking action, pistons snugly fitted in each of said cylinders, each of said pistons having a recess in the form of a curvilinear cone facing said back wall at a point remote from said opening, a pair of curvilinear cones for mating engagement with said recesses to define spaces having outlets of progressively decreased area as said pistons approach said back wall, the area of said outlets being substantially less than the area of said opening when said pistons are close to said back wall, said cones and said back wall having aligned rivet-receiving openings, and a rivet extending through said openings and having headed end portions to hold said cones in position, said last openings being greater in size than the shaft of said rivet to permit limited shifting movements of said cones to alignment with said recesses.

5. In a wheel cylinder for a hydraulic brake mechanism, a cylinder having a back wall, a piston fitting slidably in the cylinder, the cylinder having an opening adjacent the back wall for flow of operating fluid into and out of the cylinder, the piston having a recess in its end adjacent the back wall, a tapered projection extending outward from the back wall and having an opening therethrough, and a pin secured to the back wall and extending through the opening to secure the projection to the back wall, the pin being of smaller diameter than the opening to permit limited shifting of the projection into alignment with the recess.

6. In a wheel cylinder for a hydraulic brake mechanism, a cylinder having a back wall, a piston fitting slidably in the cylinder, the cylinder having an opening adjacent the back wall for flow of operating fluid into and out of the cylinder, the piston having a recess in its end adjacent the back wall, a tapered projection extending outward from the back wall and having an opening therethrough, a pin of smaller diameter than the opening carried by the back wall and extending loosely through the opening, and an enlarged head on the pin partially overlying the projection to hold the projection against the end wall for limited shifting into alignment with the recess.

ADIEL Y. DODGE.

REFERENCES CITED

The following references are of record in the file of this patent:

UNITED STATES PATENTS

| Number | Name | Date |
|---|---|---|
| 1,684,210 | Woods | Sept. 11, 1928 |
| 1,786,856 | Madden | Dec. 30, 1930 |
| 2,223,792 | Muir | Dec. 3, 1940 |
| 2,396,052 | Light | Mar. 5, 1946 |
| 2,445,061 | Goepfrich | July 13, 1948 |
| 2,490,797 | Girouard | Dec. 13, 1949 |